May 1, 1945.  H. RUPPE  2,374,959
INTERNAL-COMBUSTION ENGINE
Filed June 19, 1941  3 Sheets-Sheet 1
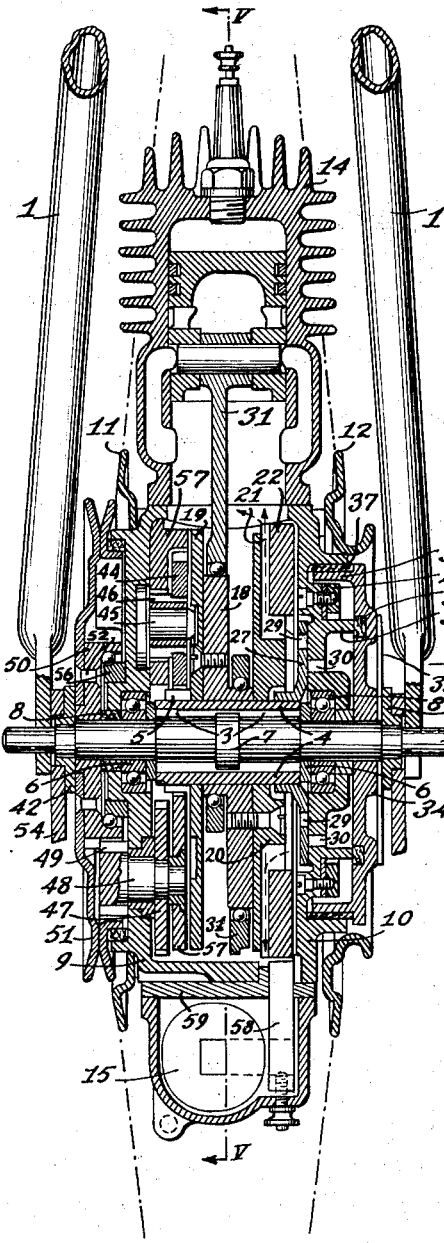
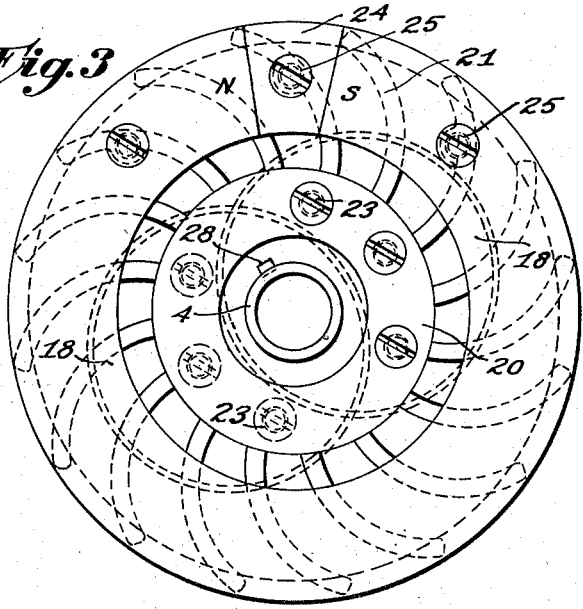
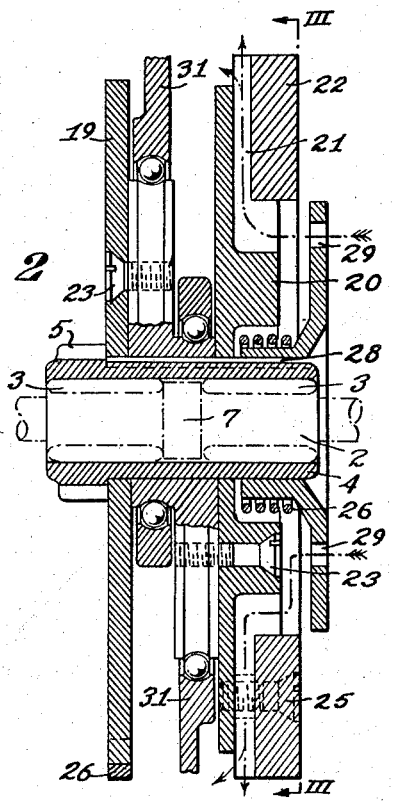
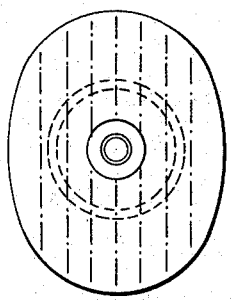
Inventor
HUGO RUPPE
By  Holcombe
Attorney.

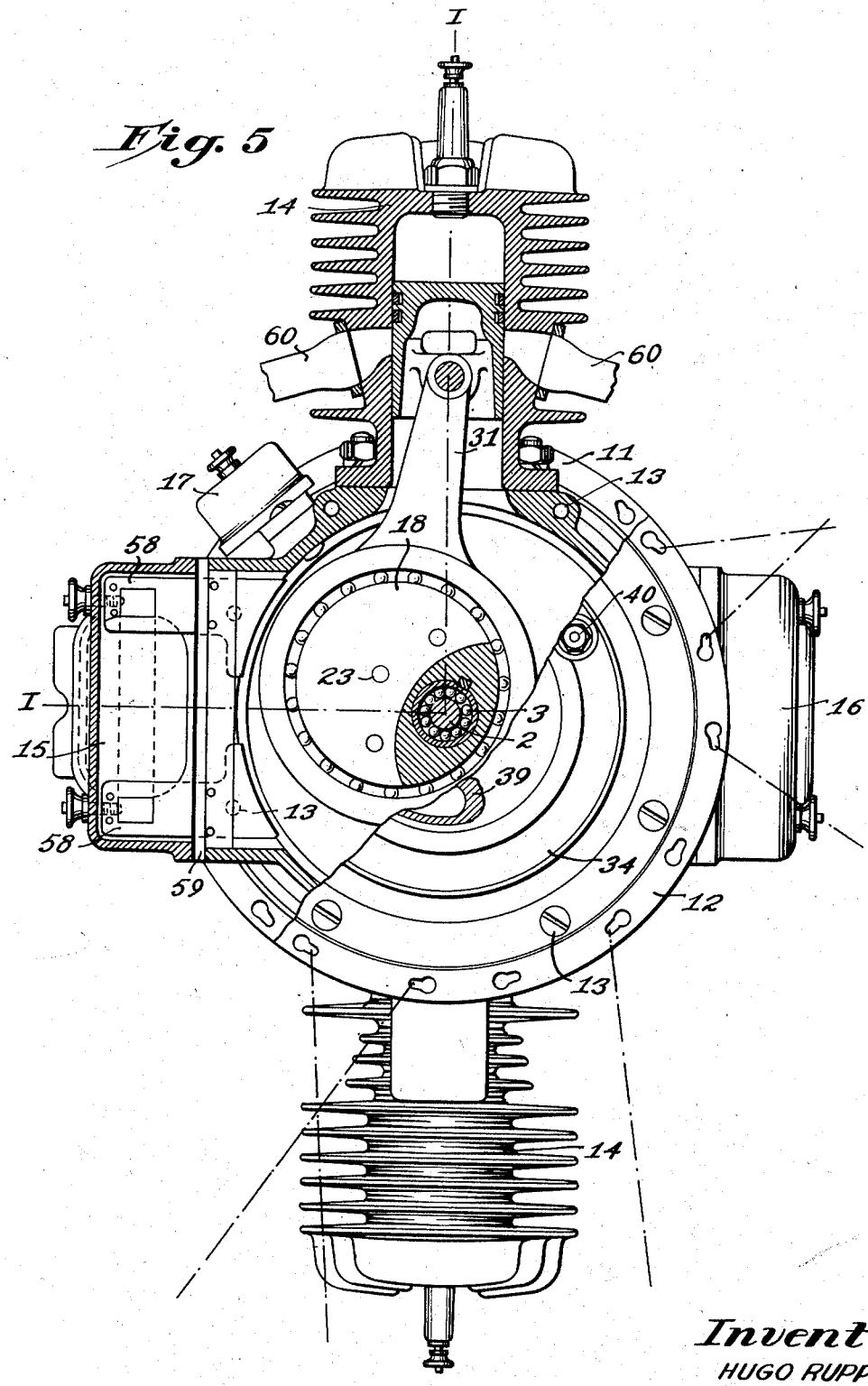

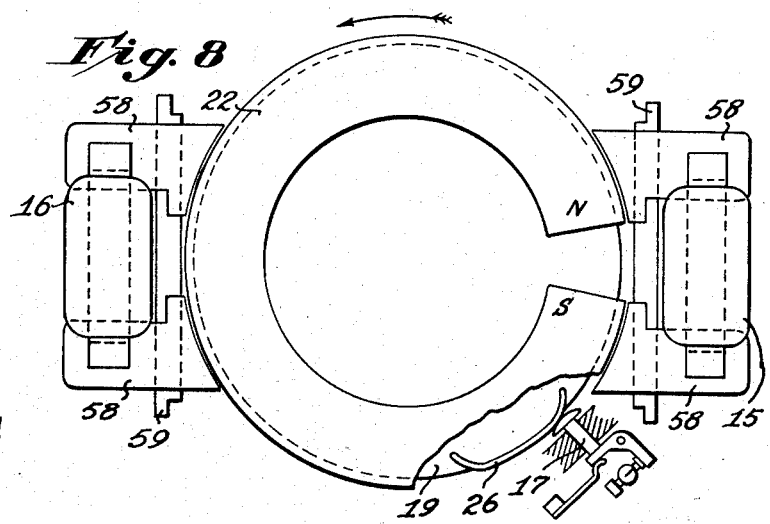
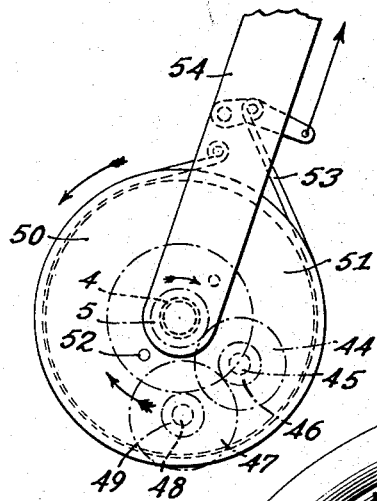
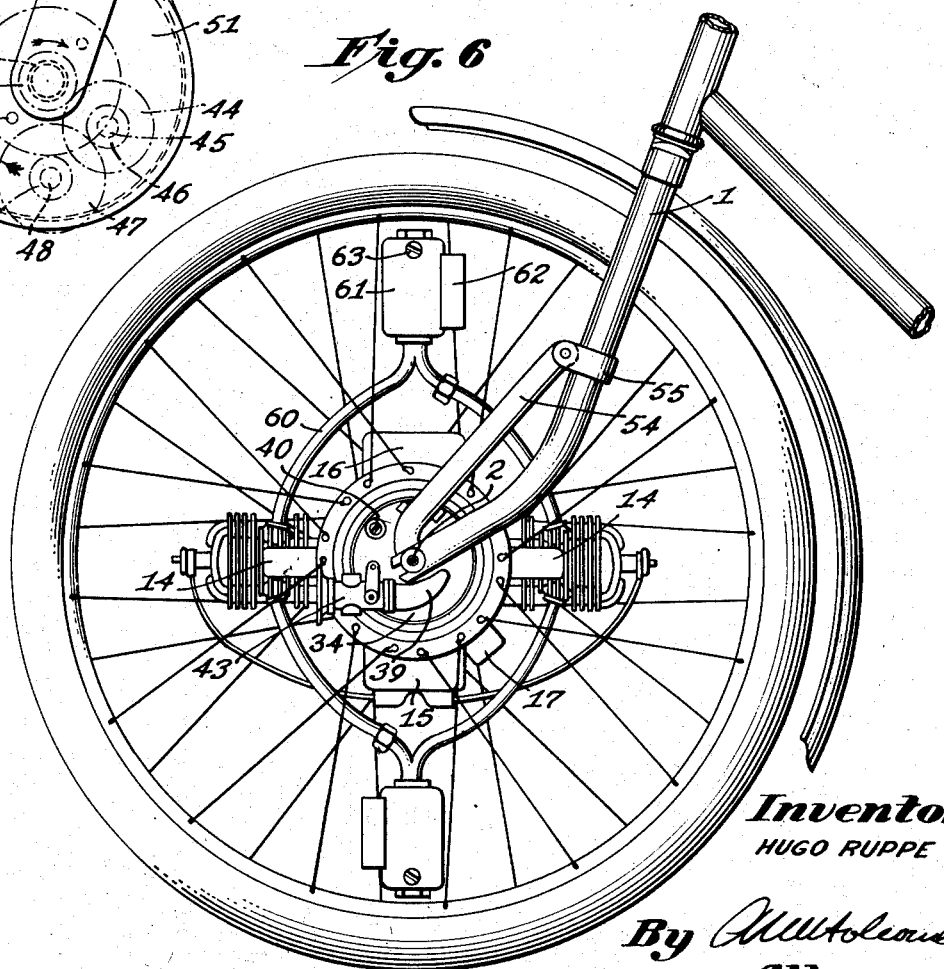

Patented May 1, 1945

2,374,959

UNITED STATES PATENT OFFICE 2,374,959

INTERNAL-COMBUSTION ENGINE

Hugo Ruppe, Berlin, Germany; vested in the Alien Property Custodian

Application June 19, 1941, Serial No. 398,831
In Germany June 29, 1940

3 Claims. (Cl. 123—44)

The invention relates to an internal combustion engine especially suitable to be mounted rotatably between the spokes of the wheel of a vehicle, for instance of a normal front wheel of a bicycle. In such motors which are known per se the connecting rods are fixed on the axle of the vehicle, the axle thereby forming a crankshaft; during operation the rods are supported on the rigid axle of the wheel in such a manner that the cylinders fixed on the spokes may rotate with the vehicle.

The invention consists in that the crankshaft is replaced by an eccentric fixed on a sleeve rotating on the rigid axle of the wheel. The sleeve (or hollow axle) is connected to a disk turning with respect to the wheel axle and is also connected to the motor casing (which carries the cylinders) through a gearing the last pinion of which is fixed in a concentric manner on the disk so that when stopping or braking the disk, the gearing rolls off onto the pinion, and the sleeve and the engine cylinder rotate with respect to the wheel axle.

Further details of the invention are described in the following specification and illustrated in the drawings. These show as one embodiment of the invention an auxiliary engine for bicycles, and Figure 1 is a section through the motor according to the line I—I of Fig. 5, the two sectionplanes being represented in the same plane;

Figure 2 shows the gearing of the motor according to Fig. 1 on an enlarged scale;

Figure 3 a view on line III—III of Fig. 2;

Figure 4 the cylinder head in a view from above;

Figure 5 the motor on line V—V of Fig. 1;

Figure 6 the motor mounted in a front-wheel;

Figure 7 on an enlarged scale the scheme of the gearing and the coupling means;

Figure 8 the scheme of the electric system of the motor.

1 is the front wheel fork of an ordinary bicycle, the fork prongs on the wheel axle being spaced apart from one another for instance by 3¾ inches. 2 is the wheel axle which serves for stiffening the front wheel fork. In this case it serves also as axle for the double needle bearing 3; on the needle bearing 3 is rotatably mounted a sleeve or hollow axle 4 which on its left end is formed as a pinion 5 (Fig. 2). Washers 6 limit the normal displacement of the sleeve 4: further they limit together with the axle shoulder 7 provided in the middle of the axle the axial movement of the needles. On both sides of the washers 6 there are provided ball bearings 8 carrying the motor casing 9, 10 on which are located the spoke rings 11, 12 which at the side are fixed by the screws 13 of the motor casing. On the circumference of the motor casing there are located on opposite sides the cylinders 14, 14, and at a right angle thereto also on opposite sides, the casing for the ignition coil 15 and the casing for the coil 16 for the lighting current. 17 designates the commutator for the igniter (Fig. 8).

The gearing of the motor consists of the axle sleeve 4, the double eccentric 18 and the disks 19 and 20 of light metal which are fixed by screws 23 (Figs. 2, 3, 5). Further on the sleeve 4 there is provided a flat rotary valve 27 controlling the admission of gas. The disk 20 carries the magnet ring 22 and has blades 21 curved against the direction of rotation and forming a turbo-fan (Fig. 3). The gas flows in the path indicated by arrows. 24 is a filling piece (Fig. 3) inserted into the magnet ring for balancing this magnet ring, and is of anti-magnetic metal and fixed as the magnet ring itself by screws 25 on the disk 20. The sleeve 4 has a longitudinal key 28, upon which is pressed the double eccentric 18 with the two disks 19, 20. The rotary valve 27 is axially movable and pressed against the wall of the motor casing by a spring 25′ in order to obtain a tight abutment. The sleeve 4 with the double eccentric 18 replaces the usual crankshaft of the motor while the magnet ring 22 serves at the same time as fly wheel. The pinion 5 is the element transmitting the force of the motor.

The rotary valve 27 has on different diameters two slots 29 located one opposite the other and coacting with two slots 30 also located on opposite sides in the wall of the motor casing-half 10. The arrangement of these slots on different diameters has the purpose to effect only one admission of gas into the crank casing during each rotation of the rotary valve. The curved lengths of the slots in the rotary valve and in the casing are so dimensioned that the admission of gas is effected during 180° of the rotation, and the slots 29 in the rotary valve 27 are so dimensioned that in spite of their different arrangement the rotary valve is balanced. The connecting rods 31 have on the one side, eyes of corresponding dimensions and are mounted by means of balls on the double eccentric 18. The balls are held apart at the illustrated distance from one another by a cage or rings especially formed (Fig. 5).

The half 10 of the casing has a circular ledge 32 (Fig. 1), on which abuts a fixed disk 34 which loosely runs on the wheel axle 2 and which is urged for instance by a star-like formed leafspring 35; the disk is fixed by a strut 54 by means of cams. On the place of abutment is inserted into the disk 34 a circular felt ring 33. In this manner between the wall of the casing 10, the ledge 32 and the disk 34 is formed a circular channel into which leads a tube 39 (Figs. 5 and 6) on which is fastened the carburetter 43 (Fig 6).

Around the circular ledge 32 is formed a second circular channel and the disk 34 on its circumference also has a circular ledge 36 with a felt ring 37 which extends into the hollow space of a corresponding circular channel of the motor casing. Within this second channel is fastened a metallic ring 41, isolated on the motor casing, the ring being connected with the winding for the lighting current. The disk 34 carries an isolated contact 40 (Fig. 4) serving for the supply of the current for the lamp and slipping on the ring 41.

The drive of the motor is transmitted to the wheel by means of pinions the construction of which is to be seen in Fig. 1 and the relative position of which is represented in Fig. 7, in a schematic manner. The pinion 5 on the sleeve 4 is in engagement with a pinion 44, which is rigidly connected to a smaller pinion 46. The double pinion 44, 46 is rotatable on a pin 45 which by means of a flange is pressed into the casing-half 9. This pin 45 carries on its end an expanding ring which prevents the double pinion from slipping off. In Fig. 1 the pinion 47 is located under the axle 2 because it is represented in a plane displaced by 90°. The little pinion 46 is in gear with the pinion 47 fixed on a shaft 48 which is extended outwardly through the wall of the casing-half 9 and here carries a pinion 49. This pinion is in gear with a pinion 50 located loosely on the wheel axle 2. The pinion 50 is secured by a nut 42 on the wheel axle and supported against the motor casing by means of balls and ball rings 56. The pinion 50 is fixed on a grooved disk 51 through screws or rivets 52. A steel wire 53 running around the grooved disk 51 serves together with the disk as a coupling device. The one end of the wire 53 is fixed on a strut 54 connected with the cycle fork and the other end is secured to a lever rockable by means of a Bowden wire. Each fork prong is provided with a strut 54 which is located on a shoulder of the nut 42 and fixed on the prong by means of a clamp 55.

The operation of the described arrangement is the following:

When the bicycle makes a stop the rotation of the gearing is transmitted to the pinion 49 by means of the double-pinion 44, 46 and of the pinion 47, the pinion 49 turning the grooved disk 51 through the pinion 50. If the disk 51 is stopped by means of the wire 53, the pinion 50 is also ped by means of the wire 53, the pinion is also stopped so that the pinion 49 rolls off on the pinion 50 and through the shaft 48 mounted in the motor casing takes with it the casing and thereby turns it. In consequence of the connection of the motor casing with the spoke rings 11, 12, the front wheel is also set in rotation. In Fig. 1 there is further represented a disk 57 which serves only for filling the space in the motor casing between the disk 19 of the gearing and the wall of the motor casing-half 9. This disk 57 has openings into which the pinions 5, 44, 46 and 47 extend. Further this disk 47 forms a second bearing for the shaft 48 and finally it abuts on a flange provided on the shaft 48 thereby securing it from breaking out of the wall of the casing. The disk 57 is therefore fastened to the casing-half 9 by means of screws.

Fig. 8 represents the electric parts. 22 is as already said a permanent steel magnet ring having the poles N and S. The pole shoes 58 extend from the exterior through two slots provided in the motor casing and arranged the one opposite to the other close to the magnet ring 22. The pole shoes 58 are cemented air- and oil-tight in the cover 59 consisting advantageously of pressed plastic material and serving to close the slots of the motor casing. The cover 59 is made of a material not conducting the electric current in order to prevent the production of electric eddy or braking fluxes round the pole shoes 58. These shoes have four-cornered openings into which are extended U-shaped cores of iron carrying the coils. The commutator 17 is actuated by a cam 26 of the disk 19 and preferably consists of a handle of hardened sheet-steel pressed into corresponding slots of the disk 19. The cam 26 is of such length that the contact is interrupted when according to Fig. 8 the edge of the S-pole of the magnet ring passes the upper edge of the pole-shoe now being in the zone of the N-pole.

Fig. 6 shows the exhaust pipes 60 and the silencer 61. The slits 62 for the exhaust of the gases are enclosed by thin elastic tongues of band-steel the longitudinal edges of which are positioned angularly the one near the other. The tongues are spread by the pressure of the exhausted gas whereby the noise of the exhaust which precedes the pressure of the gas is controlled. Any oil accumulated in the silencer may be drained by unscrewing the locks 63.

Fig. 4 represents the shape of the cooling ribs chosen so that the spokes may pass thereon. The whole arrangement permits to take off the cylinders and the silencer with the exhaust openings for cleaning purposes through the space between the spokes without the necessity to take off the motor. In the same manner all electric parts may be taken out between the spokes.

The gasoline tank not illustrated is preferably located in the frame and connected to the carburetor through a fuel tube. In order to procure a second brake device the spoke ring 12 is provided with a hollow part or rim containing a tension wire fixed to an auxiliary strut and actuated by a Bowden wire (Fig. 1).

In the preferred embodiment of the invention the motor is rotatable and used for the drive of a bicycle. It may also be provided with stationary cylinders for instance for the drive of a water pump, of a dynamo or for other purposes. In the same manner the coupling and braking means may be constructed otherwise in accordance with the intended application.

What I claim is:

1. An internal combustion engine mounted for rotation about a central support and having its radially projecting parts arranged in substantially balanced relation, said parts including a pair of cylinders diametrically opposed to each other, and a pair of electrical control parts in diametrically opposed relation midway between the cylinders and each extending radially substantially the same distance.

2. An internal combustion engine as recited in claim 1 wherein a pair of mufflers also are arranged in diametrically opposed relation midway between the cylinders and at greater radial distances from the central support than said electrical control parts, and a pair of exhaust pipes connect each muffler with the respective cylinders, said exhaust pipes extending from opposite sides of the cylinders so as to maintain substantial balance of the rotating engine.

3. An internal combustion engine as recited in claim 1 wherein one of said electrical control parts comprises the ignition coil mechanism and the other comprises a lighting current generator.

HUGO RUPPE.